United States Patent [19]

Zouzoulas

[11] Patent Number: 4,562,908
[45] Date of Patent: Jan. 7, 1986

[54] ROTARY ACTUATOR

[75] Inventor: John Zouzoulas, Havertown, Pa.

[73] Assignee: Andco Actuator Products, Inc., Cheektowaga, N.Y.

[21] Appl. No.: 546,166

[22] Filed: Oct. 27, 1983

[51] Int. Cl.[4] ............................................. F16D 47/02
[52] U.S. Cl. .................................... 192/48.5; 74/625; 192/48.91; 192/114 R; 251/129.03
[58] Field of Search ........................... 251/130; 74/625; 192/48.91, 48.5, 82 P, 95, 114 R

[56] References Cited

U.S. PATENT DOCUMENTS

| | | | |
|---|---|---|---|
| 1,966,209 | 7/1934 | Miller | 251/130 |
| 2,028,699 | 1/1936 | Beckwith | 251/130 |
| 3,198,033 | 8/1965 | Fry | 74/625 |
| 3,414,097 | 12/1968 | Denkowski | 192/48.91 |
| 4,022,309 | 5/1977 | Denkowski et al. | 192/48.5 |
| 4,130,030 | 12/1978 | Stratienko | 192/48.91 |
| 4,393,965 | 7/1983 | Zouzoulas | 192/114 R |

Primary Examiner—William E. Tapolcai
Attorney, Agent, or Firm—LeBlanc, Nolan, Shur & Nies

[57] ABSTRACT

A rotary actuator having an output driver rod mounted within an output sleeve that is rotated by a drive motor. A driving mechanism for coupling the drive motor to the output sleeve includes a worm wheel that is mounted on the output sleeve so as to be freely rotatable relative to the output sleeve and a driving portion for transmitting power from the worm wheel to the output sleeve. A clutch also is mounted on the output sleeve for rotation with and for axial movement along the output sleeve. When in its first position, the clutch couples the drive portion of the drive mechanism to the output sleeve for transmitting rotational force. The clutch is normally biased into its first position for engagement with the drive portion of the drive mechanism and thus for coupling it to the output sleeve for transmitting rotational force. A declutch mechanism causes the clutch to be moved into a second position out of engagement with the drive portion. The declutch mechanism is capable of switching from a powder driver operation to a manual hand wheel mode of operation without going through a neutral position. A self-locking means is provided to prevent rotation of the hand wheel under torsional back force when the clutch is in the second position.

15 Claims, 6 Drawing Figures

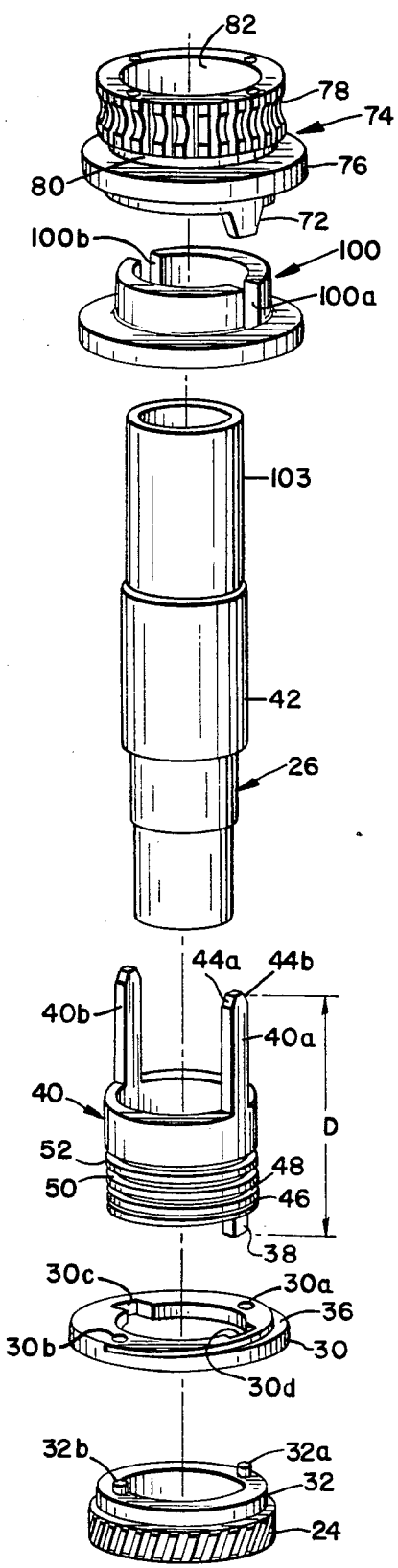
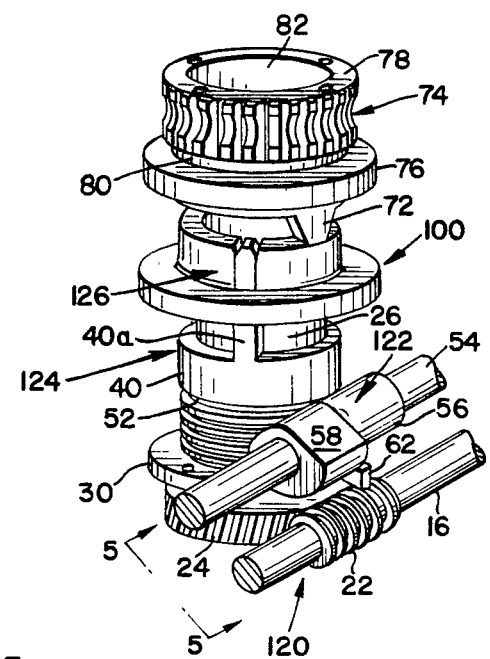
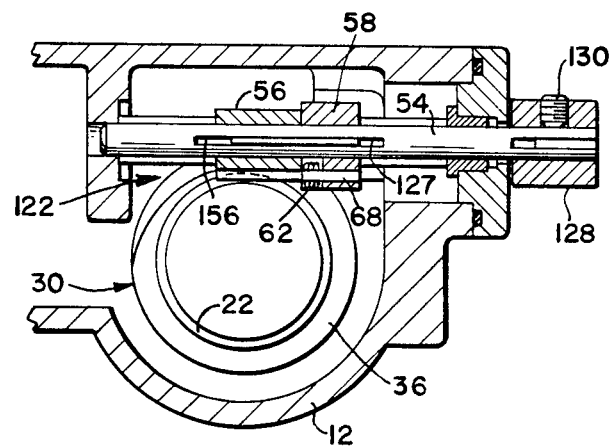
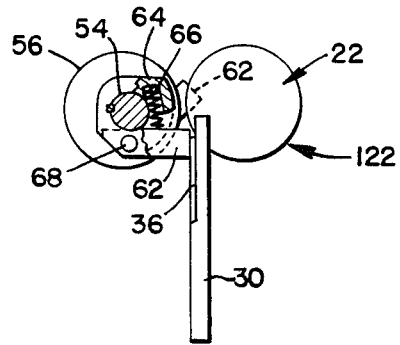

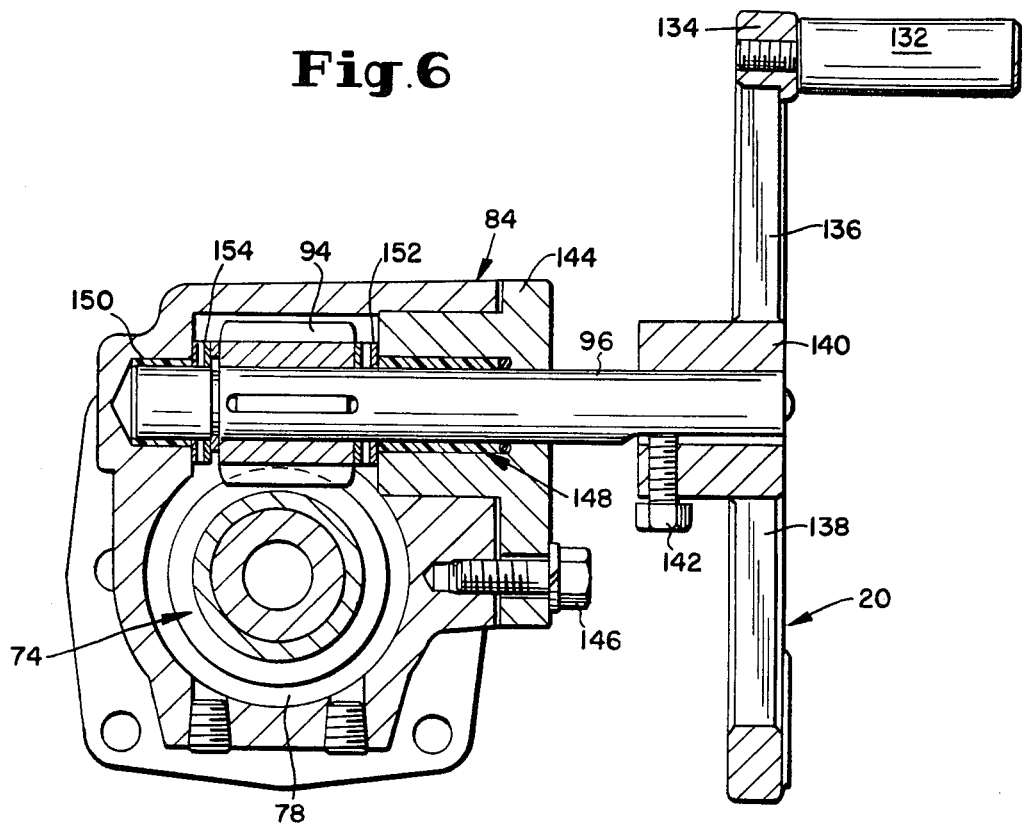

ROTARY ACTUATOR

BACKGROUND OF THE INVENTION

The present invention relates to rotary actuators with clutching and declutch mechanisms that enable the output member to be rotated by a hand wheel in the event that operation of the drive motor is temporarily interrupted.

The primary drive mechanism for the rotary actuator is an electrical drive motor. During utilization of the actuator, however, a secondary drive mechanism must be provided in case of the occurrence of a power failure, failure of the motor, or the need of manual adjustment. Often during the initial startup of the equipment that is being operated by the rotary actuator, it is desirable to be able to operate the actuator manually before placing the motor into operation. In order to accomplish all of these purposes, a secondary source of power, a hand wheel is provided for manually rotating the actuator.

A clutch mechanism and a declutch mechanism are provided for switching the rotary control of the actuator between the drive motor and the hand wheel. While both rotary actuators per se and clutching and declutch mechanisms incorporated in such actuators are well known in the art, the various devices that have been provided are relatively complex which increases both the cost of manufacturing and maintenance of such equipment.

A problem can occur in certain employments of clutching type rotary actuators when a valve, winch, or chain drive to which it is attached exerts a torsional force back through the drive members. In such situations when the back drive force is not continuously reacted by members within the actuator the attached load will shift. If the actuator can not react against such torsional force as in the case of a winch an attached load can fall, or in material transfer operations, a gate valve can close accidentally. These situations can occur when the clutch mechanism has a neutral position through which it must pass between the powered position and the manual hand wheel operating position.

Another problem which can occur during a manual mode of operation arises when continuous or intermittent torsional forces are exerted on the power output member of the acutator. The problem is that the back drive force can cause the hand wheel to begin to rotate when the clutch is in the manual mode position. Depending upon the load requirements and criticalities this could represent a dangerous condition. This of course permits uncontrolled movements of the equipment operated by the actuator when an operator is not controlling the hand wheel.

Also exemplary of the current state of the art of rotary actuators with declutch mechanisms is U.S. Pat. No. 4,022,309 to Denkowski et al. The valve operating mechanism disclosed by this patent includes both motor and manual drive devices for driving an externally threaded drive stem. The driving force is applied through a worm shaft and a worm to a worm gear. The worm gear has upstanding lugs that engage a pair of lugs that extend downwardly from a motor clutch ring. The clutch ring through a pair of detent rollers arranged within a plurality of corresponding slots drives a cup shaped drive ring that is positioned in the motor clutch ring. The lower portion of the drive ring is connected through splines to the drive sleeve. The drive sleeve in turn is internally threaded so as to be engaged with the externally threaded valve stem. When the motor power is either intentionally deactivated or a failure has occurred, the actuator mechanism can be declutched so as to switch between the motor mode of operation and a manual mode of operation. A crank or a lever can be manually rotated so as to turn a pinion declutch shaft. Secured to the declutch shaft is a pinion that has a fixed number of teeth arranged in engagement with circumferential grooves on a clutch sleeve. Arranged below the clutch sleeve is a lug ring. That lug ring is supported in an annular floor of a drive ring. The lug ring has a pair of opposing slots that are located to receive downwardly extending legs of the clutch sleeve. A pair of opposing lugs, which are spaced 180° apart, extend radially outwardly from the wall of the lug ring. Lugs are located in the upper half of the lug ring wall. In the lower part of the lug ring wall are a pair of recesses which serve to receive the detent rollers.

Numerous other patents disclose various embodiments of rotary actuators many of which have clutch and declutch mechanisms for alternatively coupling the output member to an electrical motor or a hand wheel. Exemplary of such actuators are those illustrated in the following U.S. Pat. Nos. 2,694,320 to Kron; 3,168,841 to Caldwell et al.; 3,198,033 to Fry; 3,257,866 to Fry; 3,279,276 to Fry; 3,298,249 to Nott; 3,585,867 to Grimshaw et al.; and 3,603,175 to Horton.

U.S. Pat. No. 4,393,965 issued to the inventor hereof describes and claims a rotary actuator which has a neutral clutch position and in which an attached torsionally back force can cause the hand wheel to freely rotate under an imposed back force when in the manual operating mode position. The disclosure of that patent is hereby incorporated by reference as though fully set forth herein.

These patents do not recognize the above enumerated problems arising from back drive force from the loads when not reacted by the actuators. Consequently, the problems which can arise from the availability of neutral clutching positions and hand wheels which can free wheel under torsional loading forces were not considered in actuators of the type herein described.

SUMMARY OF THE INVENTION

An object of the present invention is to provide an improved rotary actuator.

Another object of the present invention is to provide a rotary actuator with an improved clutching and declutching mechanism.

Yet another object is to provide a rotary actuator with a clutch mechanism which operates in only two powered positions and is shiftable therebetween without going through a neutral position.

Another object is to connect the output member of a rotary actuator with a hand wheel in its manual operating modes through a self locking means.

These objectives of the present invention are achieved in the utilization of a rotary actuator constructed in accordance with the present invention. The rotary actuator includes a drive motor that generates a torque for driving an output member to which an output drive rod is connected. A drive mechanism couples the drive motor to the output member that is to be rotated. The drive mechanism includes a worm wheel that is positioned around the output member and is freely rotatable relative to the output member. The worm wheel is arranged so as to be rotated by the drive motor. The driving mechanism also includes a driving portion for transmitting the power from the worm wheel to the output member. A clutch member is mounted on the output member for rotation with the output member. The clutch member, however, is axially movable along the output member. The clutch member serves to couple the output member to the drive portion of the drive mechanism when the clutch member is arranged in its first position. The clutch member is normally biased into such first position by a spring.

A declutch mechanism is provided for enabling the clutch member to be moved out of engagement with the drive portion of the drive mechanism when rotation of the drive portion ceases for any reason and into a second position where a worm gear adapter is coupled to the output member. The declutch mechanism is used when the output member is to be temporarily operated by the hand wheel due to the occurrence of either a failure of the drive motor or during certain initial start-up periods of operation before the drive motor is switched on. The clutch member is movable between the first and second positions without passing through a neutral position. The hand wheel enables manual movement of the output member until the operation of the drive motor is resumed. A retaining mechanism retains the clutch member in its second position until resumption of rotation of the driving portion. The retaining mechanism includes a tripper member that rests upon the driving portion when the clutch member is in its second position. The driving portion includes a deactivating portion which automatically deactivates the clutch member from the second position upon resumption of rotation of the driving portion thereby enabling the clutch member to be returned to its first position by the force of the biasing spring.

The declutch mechanism includes a pinion which engages a plurality of grooves on the clutch member. By rotating the pinion by a declutch knob or lever, the clutch member can be moved in an axial direction along the output member and out of engagement with the driving portion of the drive mechanism. As the declutch knob or lever is rotated so as to rotate the shaft on which the pinion is mounted, a tripper member also mounted on the shaft is similarly rotated. Once the pinion has been rotated sufficiently so as to move the clutch member out of engagement with the drive portion, the tripper is rotated into a position for resting upon the upper surface of the driving portion. The upper surface of the driving portion is provided with an eccentric cam. As long as the driving portion is not rotated, the tripper member remains in engagement with it. Once the operation of the drive motor is resumed, however, the driving portion is rotated and the eccentric cam forces the tripper member out of engagement with the driving portion. When the tripper member is kicked out of engagement, the declutch pinion is free to return to its original position. Since the clutch member is biased into its first position where it engages the drive portion, the clutch member is forced back into engagement with the driving portion simultaneously rotating the declutch pinion. Thus, resumption of the operation of the drive motor and hence the drive portion of the drive mechanism automatically returns the clutch mechanism to its first position in which the output member is then driven by the drive motor.

Extending from the rotary actuator is the output drive rod which is the member that is actually connected to the mechanism that is to be actuated, e.g. a valve stem. The output drive rod is mounted within the output member and extends from one longitudinal end of the output member. A coupling mechanism transmits the rotational movement of the output member to the output drive rod. The output drive rod is fitted with a slot and key arrangement. The coupling mechanism includes an internally bore and key stem or driver member through which the output drive rod passes.

The hand wheel is coupled to the output member by a worm gear adapter located adjacent to the longitudinal end of the output member opposite the end from which the output drive rod extends. The hand wheel is connected to the clutch member by the worm gear adapter when the clutch member is in its second position so that the clutch member then, in turn, couples the hand wheel to the output member. The coupling of the hand wheel to the worm gear adapter is by means of a self locking means which can comprise a self locking worm gear set which prevents hand wheel rotation due to imposed back drive force.

BRIEF DESCRIPTION OF THE DRAWINGS

FIG. 2 is an exploded view of a portion of the rotary actuator illustrated in FIG. 1 including the drive sleeve, clutching and declutching mechanisms of the present invention;

FIG. 3 is a perspective view of the elements illustrated in FIG. 2 as assembled for operation within the actuator mechanism;

FIG. 4 is a sectional view along lines 4—4 of FIG. 1. showing a portion of the declutching mechanism;

FIG. 5 is a sectional view taken along lines 5—5 of FIG. 3 and showing another view of the declutching mechanism illustrated in FIG. 4; and FIG. 6 is a side sectional view of the hand wheel and worm gear adapter housing taken along lines 6—6 in FIG. 1;

DESCRIPTION OF THE PREFERRED EMBODIMENTS

Figure 1:
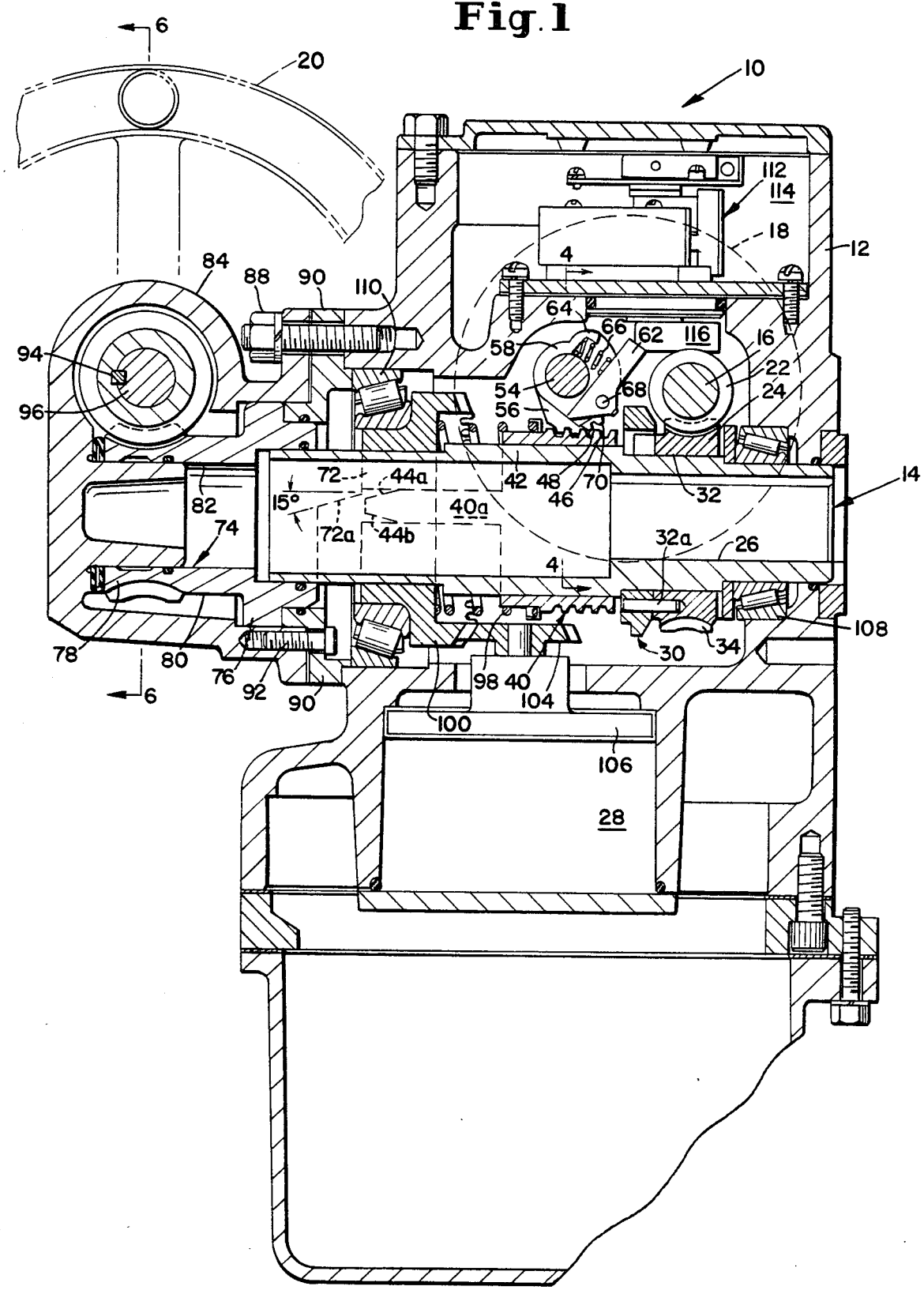
FIG. 1 is a cross-sectional side view of a rotary actuator mechanism in accordance with the present invention.

A rotary actuator 10, such as shown in FIG. 1, having an actuator housing 12 is used for providing a rotational force to a drive rod which in turn is connected to a member, such as a valve stem that is to be rotated for opening and closing the orifice of the valve. An opening 14 is provided to receive the drive rod. The rotational force, i.e. the torque, for driving the drive rod can be provided by either rotation of a worm shaft 16 by an electric motor 18 shown by a partial phantom line or a hand wheel 20.

During normal operation, the electric drive motor 18 drives external equipment in response to certain control signals so that the drive rod is rotated the desired degree. Control mechanisms for controlling the limits of rotation are referred to as position limit switches and are known within the art.

Electric drive motor 18 rotates worm shaft 16 through a drive gear (not shown). Mounted on worm shaft 16 for rotation therewith is a worm 22. Rotation of worm 22 causes rotation of worm gear 24 which is rotatably mounted on drive sleeve 26, such as shown in FIG. 1. The worm shaft 16 is journaled in spaced walls of housing 12. In controlling the operation of the electric motor 18 in response to the rotational position of the drive rod, a position limit switch arranged in a space 28 can be used. This position limit switch can be of the type disclosed in the abovementioned U.S. Pat. No. 4,328,885.

Returning to FIG. 1 in conjunction with FIGS. 2 and 3, it can be seen that drive sleeve 26 is a core element of the driving mechanism for the drive rod inserted into opening 14. Mounted at one end of drive sleeve is the worm gear 24 and an eccentric driving portion or drive ring 30. As shown in FIGS. 1 and 2 worm gear 24 is formed with a collar 32 thereon for receiving pins 32a and 32b in recesses such as recess 34 illustrated in FIG. 1 for pin 32a. The pins 32a and 32b extend through corresponding openings 30a and 30b in drive ring 30. The eccentric surface 36 of drive ring 30 is shown in FIG. 2. Drive ring 30 is also formed with slots 30c and 30d in the inner diameter of for receiving corresponding lugs such as lug 38 shown on the contracting end of a clutch sleeve 40 in FIG. 2.

Clutch sleeve 40 is rotatably mounted on an enlarged outer diameter portion 42 of drive sleeve 26 and is axially movable there along. Clutch sleeve 40 is formed with extension members 40a and 40b which are hipped at the outer ends thereof with sloping surfaces 44a and 44b as shown for extension member 40a in FIGS. 1 and 2. A series of four grooves 46, 48, 50 and 52 are formed in the exterior surface of clutch sleeve 40.

As shown in FIGS. 1 and 3 a rotatable shaft 54 is mounted within spaced walls of the actuator housing 12 and is formed with a segmental gear 56 integrally mounted thereto for rotation with radial movement of the shaft 54. A tripper cartridge 58 is also mounted on shaft 54. A tripper member 62 is biased away from a reaction shoulder 64 by a compression spring 66. Tripper member 62 is mounted on a pivot pin 68 which is attached to cartridge 58 as shown in FIG. 1.

The teeth 70 of segmental gear 56 cooperate with external grooves 46, 48, 50 and 52 on clutch sleeve 40 in order to move the clutch sleeve 40 axially along drive sleeve 26 when the shaft 54 is rotated in a clockwise direction as shown in FIG. 1. One end of shaft 54 is designed to protrude from the actuator housing 12 and to be connected to an operator lever for manual rotation of the declutching means which is constituted by elements numbered in the series of 54–70 together with the external grooves in the clutch sleeve 40.

Clockwise rotation of rotatable shaft 54 by the external operator lever causes clutch sleeve 40 to be axially moved to the left as shown in FIG. 1 and for lug 38 to be moved out of its corresponding slot 30d as shown in FIG. 2. This action also advances extension member 40a into contact with lug finger 72 formed on the interior end of the worm gear adapter 74 which consists of a mounting ring portion 76 and a worm wheel 78 which is spaced from the ring portion by a neck 80. The worm gear adapter 74 has an internal bore 82 formed therein. The worm gear adapter housing 84 is mounted to actuator housing 12 by a series of mounting bolts shown as bolt 88. By removal of mounting bolts 88 the housing 84 can be lifted away from the housing 12 along with the spacing washer 90 which is secured to the housing 84 by a series of lower bolts illustrated as bolt 92.

The worm gear 78 of worm gear adapter 74 can be rotated by a worm 94 mounted on a hand wheel shaft 96 which is, in turn, integrally connected to the hand wheel 20 (shown in phantom in FIG. 1) for rotation within the housing 84. Rotation of the worm 94 rotates the meshed worm gear adapter 74.

The clutch sleeve 40 is shown in FIG. 1 in the power driven position in which lug 38 is engaged with slot 30d as shown in the FIG. 2 exploded view. In this configuration rotation of worm shaft 16 causes worm wheel 24 to rotate about the drive sleeve 26 which in turn rotates the eccentric drive ring 30 through contact with the pins 32a and 32b. Clutch sleeve 40 is also rotated about the outer surface of drive sleeve 26 and the extension member 40a is in the first position as shown in FIG. 1. When a need for operation under manual power occurs an operator can rotate the declutching shaft 54 by rotating it in a clockwise direction as shown in FIG. 1 so that the teeth 70 of segment gear 56 are moved to the left and the clutch sleeve 40 is also moved to the left. The contact surface 44a on the end of extension member 40a will then contact sloped surface 72a on the lug finger 72 of worm gear adapter 74. This movement will also clear lug 38 on the opposite end of the clutch sleeve 40 from the slot 30d in the eccentric ring 30. By this operation the clutch sleeve 40 of the actuator will have been shifted from a power driven first position depending upon motor 18 to manually supplied power derived from the hand wheel 20. This operation will also move the tripper member 62 clockwise and on to the top surface of the eccentric drive ring 30 so that the end thereof is in contact with the eccentric surface 36 of that drive ring 30. In this configuration the tripper member 62 will prevent the clutch sleeve 40 from moving to the right as shown in FIG. 1 under force from the bias means or compression spring 98 which is forcing the clutch sleeve 40 into the driven position as shown in FIG. 1. The operator can thus release force on the operating lever controlling rotary shaft 54 while using the hand wheel 20. The manual mode of operation will remain in effect until the motor 18 is switched on. Upon rotation of the worm 22 and the worm wheel 24 by the motor the eccentric drive ring 30 will rotate and the tripper member 62 will be forced off of the eccentric surface 36 against the compression force of spring 66 so that the compression clutch spring 98 can force the clutch sleeve 40 into the position shown in FIG. 1 and at the same time rotate the declutching means shaft 54 into the position shown in FIG. 1. In this mode of operation rotation of the drive sleeve 26 will be controlled by power input from electrical motor 18.

The rotation of clutch sleeve 40 is transmitted to drive sleeve 26 through the connection of the extension members 40a and 40b through slots 100a and 100b formed in the inner diameter surface of bevel gear 100, which is in turn locked to drive shaft 26 by key 101 which is positioned in a key way 102. This type of connection is as shown in FIGS. 1 and 2. Bevel gear 100 is mounted on a reduced diameter end portion 103 of drive shaft 26 in this manner. Bevel gear 100 mates with a limit switch input pinion gear 104 which operates the mechanical switching elements within limit switch 106.

The output end of drive shaft 26 is mounted in a roller bearing 108 and the bevel gear wheel 100 is mounted within housing 12 by a roller bearing 110.

In controlling the valve of the transmitted torsional force of the electric motor 18 in response to the rotational position of the output member 26, a torque control mechanism 112 arranged in space 114 can be used. This torque control mechanism is used to limit the torque transmitted through the output member 26 within a desired range and can be of the type disclosed in U.S. Pat. No. 4,307,799 issued Dec. 29, 1981 and entitled THRUST CONTROL MECHANISM.

Refer now to FIGS. 3–5, the arrangement of the drive sleeve 26, the power drive means 120, the declutching means 122, the clutching means 124 and the rotary transmission means 126 together with worm gear adapter 74 can be seen serially in FIG. 3. The drive sleeve 26 which is surrounded by the other elements functions as an output member, which is capable of being coupled to an output drive rod through the opening 14 (shown in FIG. 1). The drive means 120 includes the power shaft 16 which is connected to a drive motor 18, a worm 22 and the worm wheel 24. The clutch means 124 is mounted on the output member adjacent to the eccentric drive ring 30 which functions as a driven portion for rotating the clutch sleeve 40 which is in turn, movable along the outside of the output member 26. The declutch means 122 is capable of causing the clutch means 124 to be moved into a second position so that the drive means 120 is not capable of rotating the clutch sleeve 40. The declutch means 122 and the clutch means 124 are arranged with respect to the drive means 120 and the worm gear adapter 74 so that the clutch sleeve 40 rotates in either of two positions. The first position is as shown in FIG. 1, wherein power is derived through the drive means 120. The second position occurs when the extension members 40a and 40b of FIG. 2 are moved into engagement with lug finger 72 of worm gear adapter 74. The total clutch sleeve distance D shown in FIG. 2 is calibrated with respect to its movement along the drive sleeve 26 so that as soon as the lugs 38 clear the slot 30d in the eccentric drive ring 30 the contact surfaces 44a or 44b come in contact with one of the two lug fingers represented by finger 72 of the worm gear adapter 74. In this manner the actuator 10 is designed to have only two operating modes. It does not have a free wheeling neutral mode where the clutch sleeve 40 is out of engagement with either of the slots 30c and 30d of the eccentric drive ring 30 and the lug fingers of the hand wheel adapter. In this manner the equipment driven by the drive rod inserted into opening 14 can be positively controlled at all times to avoid possibly unsafe conditions.

The positive control of the output drive rod can be further enhanced by employing a braking means. The braking means used in actuator 10 is a self-locking worm gear set for the worm gear 78 and worm 94 of the worm gear adapter 74. Such self-locking worm gear sets are fabricated by use of a very low helix angle normally under 5° on the worm gear. This type of worm gear configuration prevents rotation of the hand wheel against even very high torsional forces exerted on the worm gear adpater 74 by the extension members 40a and 40b of the clutch sleeve 40.

The operation of the actuator 10 in only a first position or a second position of the clutch sleeve eliminates a neutral position for the clutch means 124 which could endanger the functioning of equipment controlled by the actuator. For example if the valve stem mentioned above, for connection with a drive rod mounted in opening 14 were to be under a torsional force, this force would be transmitted into the drive sleeve 26 when the actuator was in the second position wherein operation is controlled by the hand wheel 20. Such torsional force could cause the hand wheel to begin to rotate and the valve to either open or close. This type of possibly unsafe operation by the actuator 10 can be controlled by use of the self-locking worm gear set for worm wheel 78 and worm 94.

FIGS. 3–5 also show three different views of the declutching means 122. FIG. 3 shows the tripper member 62 and the cartridge 58 in the position as shown in FIG. 1. so that the clutch means 124 is engaged with the drive means 120. FIG. 4, on the other hand, shows a tripper member 62 mounted on pivot pin 68 in its axial position where the end of the tripper member is in contact with the eccentric surface 36 of the eccentric drive ring 30. The segment gear 56 and the cartridge 58 are shown keyed to rotating shaft 54 by a key 156 positioned in a key way 127. This same configuration for the axial position of tripper member 62 positioned parallel to axis A of the eccentric drive ring 30 is shown in FIG. 5. This is the second position for clutch sleeve 40 and hence mode of operation for actuator 10 in that the extension member 40a and 40b are then in contact with lug fingers represented by lug 72. The non-engagement first position for tripper member 60 is shown by dash lines in FIG. 5.

FIG. 4 also shows an operator lever 128 connected to the exterior portion of rotating shaft 54 which protrudes through the actuator housing 12. The operator lever 128 is secured to the end of the shaft 54 by a set screw 130.

FIG. 6 shows hand wheel 20 with a knob 132 attached to the rim 134 thereof. Spokes 136 and 138 connect the rim 134 to a hub 140 which is in turn connected by a set bolt 142 to the exterior end of the worm shaft 96, which is journaled in a fitting 144 mounted in one side of the worm gear adapter housing 84. The use of fitting 144 together with a retainer bolt 146 allows the hand wheel 20 and the worm shaft 96 and the worm 94 to be removed from the side of the housing 84 for servicing. In the installed position the worm 94 contacts the worm gear 78 of the worm gear adapter 74. Sleeves 148 and 150 and washers 152 and 154 are provided for mounting worm shaft 96 in housing 84.

OPERATION OF ACTUATOR 10

Rotary actuator 10 has been described in the preferred embodiment in FIGS. 1–6. There are several important modes of operation as set forth below.

The power drive mode occurs when the lugs represented by the single lug 38 are engaged with slots 30c and 30d of the driving portion or eccentric drive ring 30, which is in turn rotated by pins 32a and 32b which protrude from ring 32 attached to the worm wheel 24. In this position the extension members 40a and 40b of clutch sleeve 40 are at the position within slots 100a and 100b of bevel gear 100 as shown in FIG. 1. Rotation of worm shaft 16 by drive motor or means 18 causes rotation of bevel gear 100 to be transmitted to drive sleeve 26 and thus to a drive rod which is connected into actuator 10 through opening 14. When a need for manual operation of the drive rod and the associated equipment connected thereto occurs, the operator moves an operator lever 128 shown connected to the actuator in FIG. 4 which causes the declutching means 122 to be activated. The movement of the operator lever causes rotating shaft 54 to rotate approximately 90°. The first portion of this movement serves to retract the lugs represented by lug 38 from slots 30c and 30d. Immediately upon lug 38 clearing slot 30d, the opposite end of clutch sleeve 40 engages lug finger 72 of worm gear adapter 74 so that there is no neutral position for the clutch sleeve 40, and in turn for the clutch means 124.

The contact of the extension members 40a and 40b with the lug fingers represented by the single lug finger 72 is through the sloped surfaces 44a and 44b as illustrated in FIG. 2. The angle of slope of the surfaces 44a and 44b as well as the slope on the contact surface 72a of the lug finger 72 is considered to be of importance. This angle can be between the range of about 12° to 18° as measured from the longitudinal plane positioned along the axis of the clutch sleeve 40 and intersecting the lug finger 72, which is shown by the horizontal construction line associated with the angular symbol in FIG. 1. The angle used should be greater than the self-locking value for these members.

In such a situation of high torsional force, the bias means or compression spring 98 might have insufficient force to move the clutch means 124 from the manual second position to the power driven first position. By sloping contact surfaces between the range of about 12° to 18° such a self-locking feature can be eliminated. This self-locking feature is of particular concern where an automatic return of clutch means 124 into the power driven first position is provided for. Operators come to rely on actuators such as described herein to operate automatically when the drive motor 18 is turned on. The actuator would not clutch into the first position, but would remain in the second position and the motor would cause free wheeling of the output member.

Once the declutching means 122 has been utilized to place the extension members 40a and 40b into contact with the lug fingers represented by lug finger 72 of the worm gear adapter 74, the drive sleeve 26 can be operated by rotating the hand wheel 20. The declutching means will remain in the second position due to the fact that tripping member or retainer means 62 will rest upon the eccentric sloped surface of drive ring 30.

When the actuator 10 has the clutch means 124 in the second position as described above, the powering of worm shaft 16 by drive motor 18 will cause the eccentric drive ring 30 to rotate and for the trip member 62 to be forced away from its retaining position. As soon as the tripping member 62 clears the shoulder of the eccentric drive ring 30, the bias means or compression spring 98 will cause the clutch sleeve 26 to move to the right as shown in FIG. 1. This will automatically clutch the clutch sleeve 40 into the power position shown in that Figure.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. An actuator comprising:
    a drive motor;
    an output member capable of being coupled to an output drive rod;
    drive means including a worm wheel mounted around said output member and freely rotatable relative thereto, said worm wheel being arranged so as to be rotated by said drive motor, and a driving portion mounted on said worm wheel for transmitting power from said worm wheel to said output member;
    clutch means mounted on said output member at a location adjacent said driving portion for rotation therewith but being axially movable along said output member, said clutch means having at least one lug member at one end capable of engaging said driving portion and having at least one extension member at its other end coupling said clutch means to said output member so that said clutch means couples said output member to said driving portion of said drive means when said clutch means is arranged in a first position in which said lug member of said clutch means engages said driving portion of said drive means;
    bias means for normally biasing said clutch means into its first postion;
    declutch means capable of causing said clutch means to be moved into a second position so that said lug member is moved out of engagement with said driving portion and remain out of engagement when said driving portion is not rotated;
    said extension members capable of engaging said clutch means to said output member immediately upon movement of said clutch means out of the first position and into the second position;
    a hand wheel;
    said output member including a worm gear adapter means capable of manual rotation by said hand wheel when said clutch means is in said second position to rotate said output member through said last named engagement of said clutch means to said output member; and
    said output member arranged to be in engagement with said drive means solely when said clutch means is in the first position or to be in engagement with said worm gear adapter means solely when said clutch means is in the second position whereby said clutch means is movable from the first position into the second position without passing through a neutral position.

2. An actuator according to claim 1, wherein said worm gear adapter means comprises a self-locking means whereby torsional forces exerted on said output member by said driver are prevented from causing said hand wheel to rotate.

3. An actuator according to claim 1, wherein the axis of said hand wheel is arranged perpendicular to the axis of said output member.

4. An actuator according to claim 1, wherein said actuator further comprises:
    retaining means for retaining said clutch means in its second position until resumption of rotation of said driving portion, said retaining means including a tripper member that rests upon said driving portion when said clutch means is in its second position; and
    said driving portion including deactivating means for automatically deactivating said declutch means upon resumption of rotation of said driving portion and enabling said clutch means to return from its second position to its first position.

5. An actuator according to claim 4, wherein said clutch means in its first position is in engagement with said driving portion, and wherein said driving portion has an eccentric section on its upper surface facing said clutching means, said declutch means moves said clutch means out of engagement with said driving portion and as said clutch means moves said tripper member is brought into engagement with said upper surface of said driving portion adjacent said eccentric section, and said tripper member when engaged with said upper surface of said driving portion prevents said clutch means from returning to its first position.

6. An actuator according to claim 5, wherein said eccentric section forces said tripper member out of engagement with said driving portion when said drive means is rotated thereby allowing said bias means to return said clutch means to its first position.

7. An actuator according to claim 6, wherein said driving portion rotates when said drive motor rotates so that said tripper member only retains said clutch means in its second position when operation of said drive motor is terminated and said tripper member is forced out of engagement with said driving portion immediately upon reactivation of said drive motor so that said clutch means is automatically returned to its first position.

8. An actuator according to claim 1, wherein said worm gear adapter has a plurality of lug fingers extending in the direction of said clutch means and wherein said lug fingers and said extension members of said clutch means have contact surfaces for power transmission therebetween and wherein said contact surfaces have angles of between the range of about 12° to 18° with the longitudinal plane positioned along the axis of said clutch means and intersecting said lug fingers.

9. An actuator according to claim 1, wherein said worm gear adapter is provided with two lug fingers and said clutch means is provided with two extension members.

10. An actuator comprising:
a drive motor providing a rotational output;
a drive sleeve having a free output end capable of being coupled to a member to be actuated;
a worm wheel coupled to the output of said drive motor so as to be rotated by said drive motor;
clutch means for coupling said worm wheel to said drive sleeve when in a first position so as to rotate said drive sleeve;
a hand wheel and worm gear adapter capable of being coupled to said clutch means at a position adjacent to the other longitudinal end of said drive sleeve opposite the end from which the member to be actuated is attached;
said clutch means movable out of the first position to uncouple said worm wheel from said drive sleeve and into a second position for coupling said drive sleeve to said worm gear adapter;
said clutch means adapted solely for movement between engagement with said worm gear and engagement with said worm gear adapter without passing through a neutral position; and
said hand wheel and worm gear adapter adapted for use to rotate said drive sleeve when said worm wheel is uncoupled from said drive sleeve.

11. An actuator according to claim 10, wherein said worm wheel has a driving portion capable of having said clutch means coupled thereto for rotating said clutch means when said clutch means is in a first position and further comprising bias means for normally biasing said clutch means into its first position.

12. An actuator according to claim 11, wherein said worm gear adapter means for connecting said hand wheel to said clutch means when said clutch means is moved into a second position out of engagement with said driving portion of said worm wheel comprises a self-locking means whereby torsional forces exerted on said drive sleeve by said driver do not cause said hand wheel to rotate.

13. An actuator according to claim 12, further comprising:
declutch means capable of causing said clutch means to be moved into a second position out of engagement with said driving portion of said worm wheel and into engagement with said worm gear adapter means and retaining means for retaining said clutch means in its second position when said driving portion is not rotated and to remain in the second position until resumption of rotation of said driving portion.

14. An actuator according to claim 13, wherein said retaining means includes a tripper member that rests upon said driving portion when said clutch means is in its second position.

15. An actuator according to claim 14, wherein said driving portion includes deactivating means capable of automatically deactivating said declutch means and enabling said clutch means to return to its first position.

* * * * *